United States Patent [19]

Bykhovsky et al.

[11] 4,229,873
[45] Oct. 28, 1980

[54] METHOD OF PRODUCING NONCONSUMABLE ELECTRODE FOR USE IN ARC TECHNIQUES

[76] Inventors: David G. Bykhovsky, Konjushenny pereulok, 1, kv. 18; Vyacheslav G. Sobolev, ulitsa Aerodromnaya, 7, kv. 61, both of Leningrad, U.S.S.R.

[21] Appl. No.: 942,908

[22] Filed: Sep. 15, 1978

Related U.S. Application Data

[63] Continuation of Ser. No. 677,859, Apr. 16, 1976, abandoned, which is a continuation of Ser. No. 466,255, May 2, 1974, abandoned.

[51] Int. Cl.$^3$ .......................... H01T 17/00; H01J 9/04
[52] U.S. Cl. ..................................... 29/420; 29/25.17; 219/145.21; 219/146.21; 313/346 DC
[58] Field of Search ....................... 219/145.21, 146.21; 313/346 R, 346 DC; 252/515; 29/25.17, 420

[56] References Cited

U.S. PATENT DOCUMENTS

| | | | |
|---|---|---|---|
| 2,624,024 | 12/1952 | Jansen et al. | 313/346 R X |
| 2,700,118 | 1/1955 | Hughes et al. | 313/346 R X |
| 2,722,626 | 11/1955 | Coppola et al. | 313/346 DC |
| 2,744,183 | 5/1956 | Conant | 252/515 |
| 2,922,028 | 1/1960 | Butler et al. | 219/145.21 |
| 3,086,103 | 4/1963 | Hackman et al. | 219/145.21 |
| 3,198,932 | 8/1965 | Weatherly | 219/145.21 |
| 3,531,679 | 9/1970 | Katz | 313/346 R |
| 3,534,455 | 10/1970 | Bondley | 313/346 R X |
| 3,597,649 | 8/1971 | Bykhovsky et al. | 219/145.21 X |
| 3,842,309 | 10/1974 | Van Stratum et al. | 313/346 R X |
| 3,911,309 | 10/1975 | Kummel et al. | 313/346 R |
| 3,983,440 | 9/1976 | Scott et al. | 29/25.17 X |

FOREIGN PATENT DOCUMENTS 1421353 11/1965 France .............................. 219/145.21

*Primary Examiner*—Francis S. Husar
*Assistant Examiner*—K. J. Ramsey
*Attorney, Agent, or Firm*—Haseltine, Lake & Waters

[57] ABSTRACT

A method of producing a nonconsumable electrode comprising forming a blind hole in the working end face of a high-melting core of the electrode, partially filling the blind hole with doping agents and then filling the remaining portion of the hole with a mixture of the doping agents and high-melting core material. The mixture is then heated from the surface of the electrode until a fused surface layer is formed and an enclosed space with doping agents is provided in the electrode.

5 Claims, 6 Drawing Figures

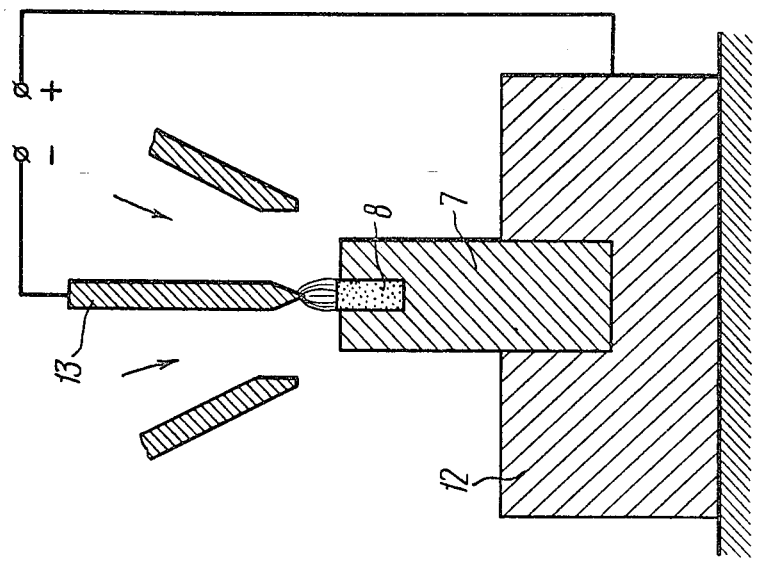
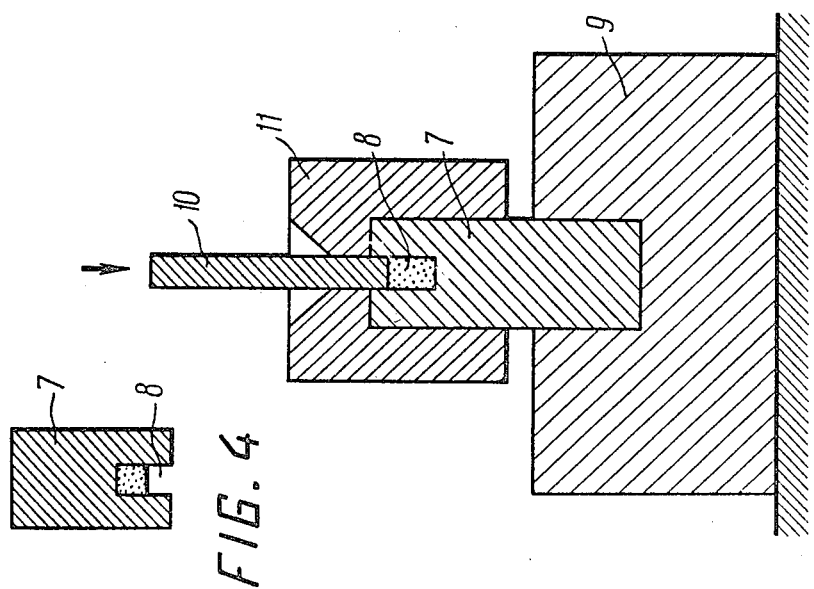

METHOD OF PRODUCING NONCONSUMABLE ELECTRODE FOR USE IN ARC TECHNIQUES

CROSS-RELATED APPLICATION

This Application is a continuation of co-pending Application No. 677,859 filed Apr. 16, 1976 now abandoned which in turn is a continuation of Ser. No. 466,255 filed May 2, 1974 and now abandoned.

FIELD OF THE INVENTION

The present invention relates to plasma arc working of electrically conductive materials and more particularly to method of producing a nonconsumable electrode for use in arc techniques.

The nonconsumable electrode of the invention is advantageous for plasma arc welding, surfacing and shielded arc welding on all metals.

PRIOR ART

Known in the art are nonconsumable electrodes for use in arc techniques comprising tungsten cores into which with a view to improving their operation such dopants as lanthanum, yttrium and thorium oxides in different combinations are introduced and uniformly distributed during their manufacture.

A disadvantage of such nonconsumable electrodes is that during the arc process the dopants evaporate gradually from the surface layer of the nonconsumable electrode in contact with the near-the-electrode zone of the arc with a corresponding increase in heat flux necessitating periodic regrinding of the nonconsumable electrode to preclude its damage due to overheating. With the nonconsumable electrodes employed on an industrial scale, the above disadvantage leads to heavy losses of working time and large costs.

Another disadvantage of the known nonconsumable electrode is that the arcing stability diminishes as the dopants evaporate from the surface layer of the nonconsumable electrode which adversely affects the quality of welding.

Moreover, with the doping agents employed at present in the known nonconsumable electrodes, such as lanthanum, yttrium or thorium oxides, used either separately or in different combinations, even the initial heat flux is sufficiently large so that forced cooling is required when operating with high currents.

The nonconsumable electrodes with doping agents are manufactured mainly by two methods: by fusing tungsten together with corresponding doping agents at a temperature at least not lower than the tungsten melting point or by sintering tungsten powder with pulverized dopants at a temperature lower than the tungsten melting point.

The method of fusing tungsten together with the dopants for manufacturing nonconsumable electrode suffers from the disadvantage, that tungsten alloys with such easily evaporating doping agents as barium and calcium oxides cannot be obtained, whereby it is not feasible to obtain nonconsumable electrodes with lower heat fluxes in comparison with those containing such doping agents as lanthanum, yttrium and thorium oxides.

Peculiar to another method of producing nonconsumable electrodes by sintering is the disadvantage that the nonconsumable electrodes manufactured by the above procedure have lower thermal and electrical conductivities as compared with the fused electrodes.

SUMMARY OF THE INVENTION

The principal object of the invention is the provision of a nonconsumable electrode and a method of producing same ensuring stable continuous operation of the electrode without changing its operating conditions.

This object is achieved in that in a nonconsumable electrode for use in arc techniques constituted as a high-melting core with doping agents, according to the invention, the body of the high-melting core has a closed space located in the vicinity of its working end face essentially symmetrically to the core axis and accommodating the doping agents, the closed space being disposed at such a distance from the working end face as to ensure continuous diffusion of the doping agents from the closed space to the working end face during the arc process.

It is expedient that tungsten be used as the material of the high-melting core and oxides from lanthanide or actinide series, alkali and alkali-earth metals, elements of the III and IV groups of the Periodic System in different combinations as be used doping agents.

It is also sound practice that in the method of producing the nonconsumable electrode, the central part of the high-melting electrode core be fitted on the side of its working end face with a blind hole to be filled partially with the doping agents, the remaining portion being a mixture of the high-melting material and doping agents, after which the surface layer is fused until the closed space is formed.

The location in the herein-proposed nonconsumable electrode near its working end face of the closed space charged with the doping agents ensures continuous diffusion of the dopants to the electrode working end face by virtue of which the electric arc will have constant properties during the entire operation.

Another advantage of the proposed nonconsumable electrode is the reduction in the heat flux acting on the nonconsumable electrode which is achieved by the use of such doping agents as barium and calcium oxides having minimum work function values as compared with such doping agents as yttrium, thorium and lanthanum oxides.

Moreover, the nonconsumable electrode of the proposed construction enables the use of any doping agents irrespective of their thermophysical and physicochemical properties, particularly their vapor pressure, melting and boiling points, whereas the known constructions required such doping agents which could have been fused together with tungsten.

The proposed method of producing the nonconsumable electrodes offers the following advantages: higher labor productivity and minimum amount of waste, the main merit residing in that the nonconsumable electrode thus obtained does not need working-in, insofar as the working end face of such an electrode is already covered with the doping agents. The proposed method can be readily automated which is a prerequisite for mass production of nonconsumable electrodes.

BRIEF DESCRIPTION OF THE DRAWINGS

The invention is further exemplified by a detailed description of an exemplary embodiment, to be had in conjunction with the accompanying drawings, wherein:

FIGS. 4, 5, 6 illustrate the sequence of operations when realizing the proposed method of producing nonconsumable electrodes.

DETAILED DESCRIPTION

In the course of development it was established that the breakdown of nonconsumable electrodes operating continuously is attributable to constant depletion of the doping agents in the electrode working end face, a feature leading initially to an excessive mobility of the near-the-electrode zone of the arc (the doping agents being preserved longer within the periphery of the working end face) and to an intense breakdown of the electrode proper as the peripheral portions of the electrode working end face become rapidly depleted of the doping agents. Hence, the main problem to be solved in the production of nonconsumable electrodes is to extend their service life for higher currents by continuous feeding of the doping agents as the latter are evaporated from the surface layer of the nonconsumable electrode.

Figure 1:
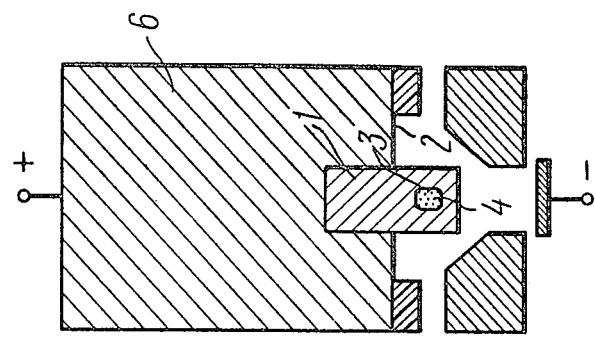
FIG. 1 shows a nonconsumable electrode.

The proposed nonconsumable electrode (FIG. 1) comprises a high-melting core 1 with a space 3 located in the vicinity of working end face 2 of the core 1, almost symmetrically to its axis and adapted to accommodate doping agents 4. The closed space 3 with the doping agents 4 is disposed at such a distance from the working end face 2 as to provide continuous diffusion of the doping agents 4 from the closed space 3 to the working end face 2. The geometry and dimensions of the closed space 3 can be changed, thereby adjusting the period of continuous operation of the nonconsumable electrode.

Figure 2:
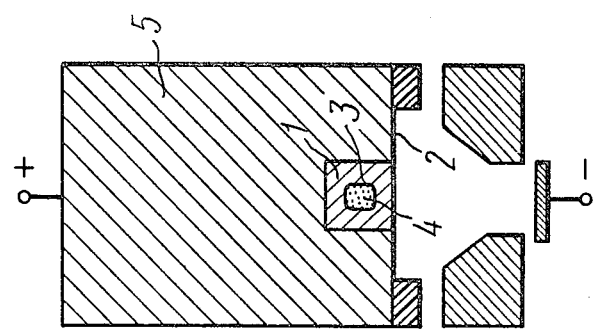
FIG. 2 shows a nonconsumable electrode mounted in a reverse polarity plasamatron.

The proposed nonconsumable electrode can be mounted in reverse polarity plasmatrons (FIG. 2).

In this case, the high-melting core 1 with the space 3 filled with the doping agents 4 is located within a cooled holder 5 flush therewith and is coupled to a positive pole of a power supply source.

In the course of operation, the near-the-electrode zone of the arc is disposed in the vicinity of the center of the working end face 2 of the nonconsumable electrode, because due to the presence of the doping agents, a minimum near-the-electrode voltage drop will take place at this point. With the arc burning, the following processes take place: the doping agents gradually evaporate from the surface layer of the working end face 2 of the nonconsumable electrode. As a result a gradient in concentration of the doping agents takes place between the working end face and the surface adjoining the space 2 wherein the doping agents 4 are contained. Under the effect of the concentration gradient, diffusion of the doping agents 4 is initiated with the dopants spreading from the space 3 to the working end face 2. The higher the arc current, the higher the rate of evaporation of the doping agents and the larger the concentration gradient and the rate of diffusion of the doping agents 4 from the space 3 will be. All this ensures automatic maintenance of the constant composition of the doping agents on the working end face 2 of the nonconsumable electrode and ensures its stable operation.

Figure 3:
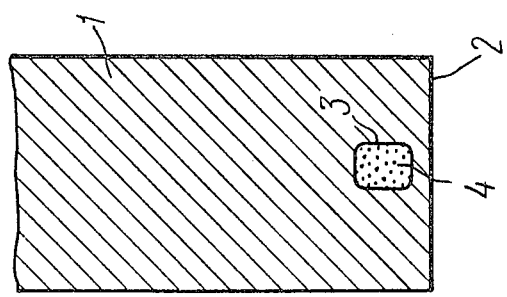
FIG. 3 depicts a nonconsumable electrode mounted in a straight polarity plasmatron.

In case the nonconsumable electrode is set up in a straight polarity plasmatron (FIG. 3) the high-melting core 1 is so fastened in a holder 6 that at least a fraction of the high-melting core 1 with the space 3 and working end face 2 project beyond the holder 6 connected to a negative pole of the power supply source (not shown in the drawing).

Such fastening of the nonconsumable electrode is feasible since the heat flux in the electrode operating on straight polarity is 4–6 times lower than in that on reverse polarity, which makes it possible to reduce the cooling intensity and to obviate forced cooling in general when operating on currents of up to 200 A. All the other phenomena which take place during the arc process are similar to those with the arc in a reverse polarity plasmatron.

In operating the nonconsumable electrode, tungsten was employed as the material of the high-melting core and cerium, zirconium, yttrium, barium and calcium oxides as the doping agents.

When operating on reverse polarity, best results were obtained by using yttrium oxide ($Y_2O_3$) as the dopant, while in operating on straight polarity it was barium oxide (BaO) which gave the most promising results in combination with the high-melting tungsten core.

Considered hereinbelow is the method of producing the proposed nonconsumable electrode.

A deep hole 8 is diamond drilled in a blank 7 (FIG. 4) of a tungsten high-melting core so that the hole depth approaches the diameter of the high-melting core and its diameter is almost ¼ that of the core. The blind hole 8 is filled with pulverized doping agents, such as barium oxide (BaO) or yttrium oxide ($Y_2O_3$). Next the blank 7 of the high-melting tungsten core with the doping agents is placed into a supporting die 9 (FIG. 5) of a hydraulic press and the pulverized doping agents are pressed under a pressure of a punch 10 arranged in an arresting die 11, until its volume approximates 3/5 the depth of the blind hole 8.

Thereafter, the remaining recess is filled with a mixture of tungsten powder and 2% by weight of the pulverized doping agents. The mixture is again pressed so that the pile thus obtained projects beyond the working end face 2 of the nonconsumable electrode to approximately 1/10 of the depth of the blind hole 8. Then the thus produced blank is placed in a socket 12 under a conventional argon-arc torch so that an electrode 13 of the argon-arc torch is spaced from the projecting point of the pile by about 1–3 mm. Upon striking an arc, a current of from 10 to 150 A is set up depending on the diameter of the high-melting core, the current being sustained for 0.5–5 s. whereupon the arc is extinguished, the nonconsumable electrode being blown with argon for another 1–5 s. to prevent oxidation.

What we claim is:

1. A method of producing a nonconsumable electrode ready for use in arc techniques without working-in operations, said method comprising forming a blind hole in the working end face of a high melting core of an electrode, the hole extending axially in the electrode in substantially symmetrical relation therein, filling said blind hole with pulverized doping agents, compressing the doping agents in said hole to a depth of about 3/5 the depth of the blind hole, filling the remaining portion of the hole with a mixture of the pulverized doping agents and a powder of the high melting core material, said high melting core material being present in a predominant amount in said mixture and heating the mixture from the surface of the electrode until a permanent fused surface layer is formed at the hole to produce an enclosed space with doping agents in the electrode wherefrom the doping agents can diffuse through the fused surface layer and provide constant and stable operating characteristics at the working end face of the core.

2. A method as claimed in claim 1 wherein said high melting core material is present in said mixture in an amount of 98% and thereby the fused surface layer forms a substantially solid body integral with the walls of the blind hole.

3. A method as claimed in claim 1 wherein the high-melting core material is tungsten and the doping agents are selecting from the group consisting of cerium oxide, zirconium oxide, yttrium oxide, barium oxide, and calcium oxide.

4. A method as claimed in claim 1 wherein said core is cylindrical and has a given diameter, said hole being formed to a depth substantially equal to the diameter of the core, said hole having a diameter substantially equal to ¼ the diameter of the core.

5. A method as claimed in claim 4 comprising compressing said mixture after addition to the hole, said mixture being added in an amount to project beyond the hole by an amount of about 1/10 the depth of the hole.

* * * * *